Jan. 20, 1942.       R. C. CRAIN       2,270,511
SAMPLING DEVICE
Filed Jan. 17, 1940
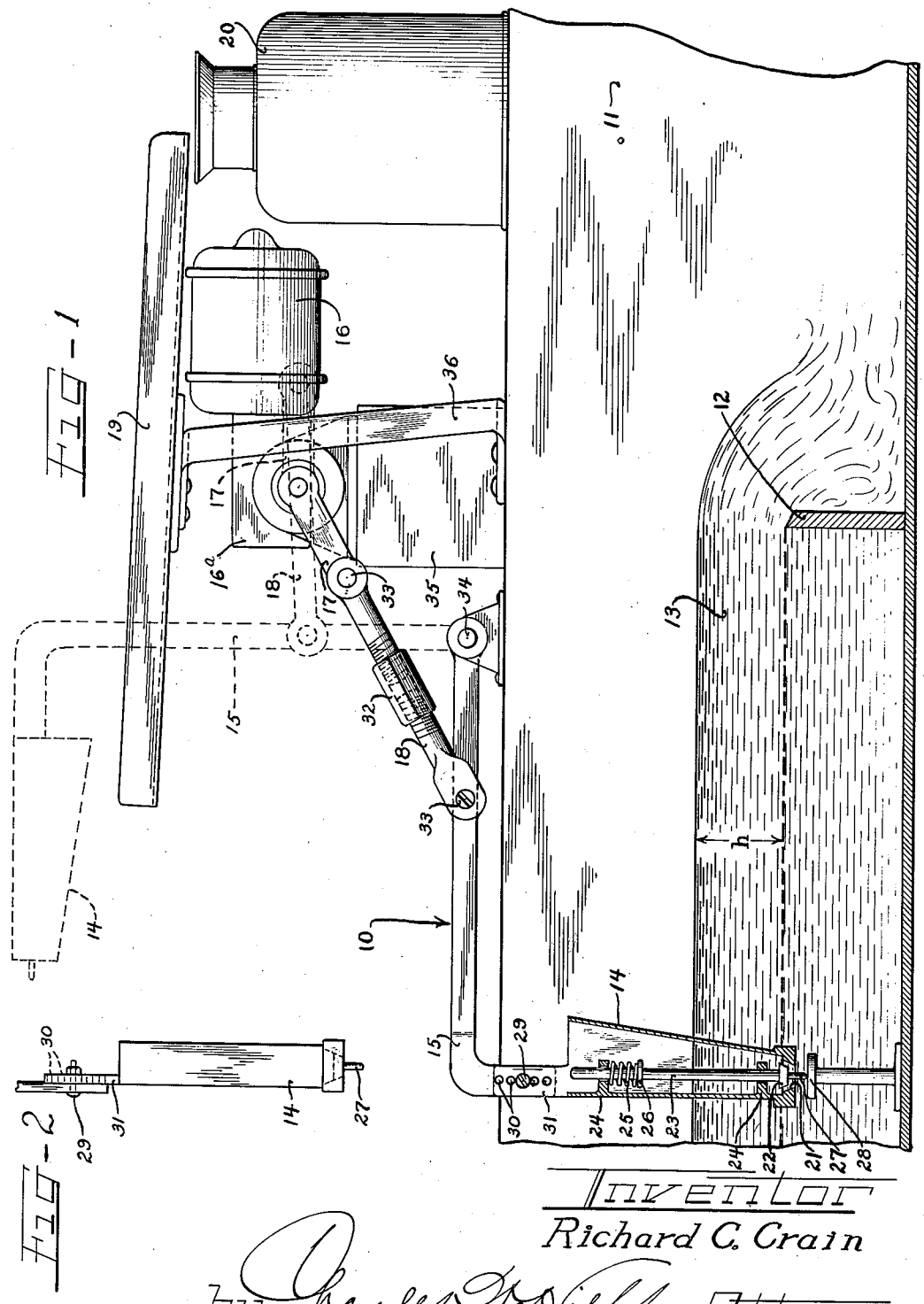
Inventor
Richard C. Crain
by Charles H. Neill Attys Patented Jan. 20, 1942

2,270,511

UNITED STATES PATENT OFFICE 2,270,511

SAMPLING DEVICE

Richard C. Crain, Port Edwards, Wis., assignor to Nekoosa-Edwards Paper Company, Port Edwards, Wis., a corporation of Wisconsin Application January 17, 1940, Serial No. 314,263

6 Claims. (Cl. 73—21)

This invention relates to a device for sampling a stream of liquid. More particularly, the invention pertains to sampling means for determining the total amount of flow of a liquid over a prolonged period of time and for simultaneously obtaining a sample of the average composition of the flowing liquid.

In handling large amounts of a streaming liquid it is frequently necessary or desirable to measure the quantity of flow and to simultaneously obtain samples of the liquid from which its average composition may be determined. This is particularly true in cases where the streaming liquid contains in solution or suspension materials whose nature and/or amount vary independently of the rate of flow.

In measuring the amount of flow it has heretofore been customary to conduct the streaming liquid through an open channel having an obstruction or weir of known dimensions extending across the bottom thereof. The rate of flow may then be calculated from measurements of the head above the crest of the weir, various theoretical formulae or empirical charts being utilized for this purpose.

A number of conventional devices are available for withdrawing samples from a streaming liquid. Some of these conventional devices are characterized by the fact that the successive samples withdrawn are of substantially the same size. The time intervals between the withdrawal of successive samples, however, may be varied in inverse proportion to the rate of flow, so that the total amount of liquid withdrawn will constitute a representative sample of the liquid streaming past the sampling point during the time the samples were withdrawn. This correlation between rate of flow and time intervals between withdrawal of samples may be effected by means of an integrating level recorder which translates head readings into a measurement of rate of flow by the operation of a cam or other suitable mechanical integrating device.

Thus, to determine the average composition and total amount of liquid streaming past a given point during a definite period of time, the prior art has made use of two cooperating but separate devices, namely, a level recorder and an automatic sampler regulated by said recorder. A considerable amount of computation is necessary to translate the data obtained from these prior art measuring devices into the desired values.

The present invention provides sampling means which may be used to yield representative samples. My sampling device is so operated as to effect the withdrawal, at equal intervals of time, of samples of magnitudes proportional to the rate of flow obtaining at the withdrawal of the samples. Sampling means according to the present invention are preferably used in conjunction with a weir and comprise a sampling cup together with means for dipping said cup at predetermined equal intervals into the streaming liquid to a depth corresponding to the head over the crest of the weir. Means are provided for filling the sampling cup when at this depth to a level equal to the head above the crest of the weir. The dipping means also serve to withdraw and empty the thus filled sampling cup after each dipping. The sampling cup is so shaped in accordance with known formulae or empirical charts that the volume of liquid contained in said cup at any liquid level therein is proportionate to the rate of flow corresponding to the head above the weir determining the liquid level in said sampling cup.

This invention further provides means for uniting successive samples withdrawn, so that their united volume will give, by simple proportion, a measurement of the total amount of flow during the time said samples were collected. The final collective sample thus obtained is also representative of the total amount of liquid streaming past the sampling point during the time the samples were being collected.

It is therefore an important object of the present invention to provide sampling means adapted to yield, in one operation, a representative sample as well as a direct measurement of the total amount of liquid streaming past a given point during a definite period of time.

Another important object of this invention is to provide sampling means adapted to effect the withdrawal, at equal intervals of time, of samples of magnitudes proportional to the rate of flow prevailing at the time of withdrawal, so that united samples collected during a given period of time will constitute a representative sample of the liquid streaming past the sampling point during said period, while the volume of said united samples will be directly proportional to the total amount of flow during the same period.

A further important object of the invention is to provide sampling means involving a sampling cup and means for dipping said cup into a streaming liquid to a depth corresponding to the head of said liquid, means being provided for filling said cup to a liquid level therein corresponding to said head, and said cup being so shaped that the volume of liquid contained therein at any liquid level is definitely correlated to the head determining said level.

Other and further important objects of this invention will become apparent from the following description and thereto appended drawing and claims.

This invention (in a preferred form) is illustrated in the appended drawing and hereinafter more fully described.

In the drawing:

Figure 1 is a side elevational view, partly in section, of a sampling device according to this invention as disposed in operative relationship to a conduit for a streaming liquid.

Figure 2 is a front elevational view of the sampling cup of the device shown in Figure 1 together with connective means joining said cup to the means for dipping the same into said streaming liquid.

As shown on the drawing:

In Figure 1 the reference numeral 10 indicates generally a sampling device according to this invention disposed in operative relationship to an open sewer 11 having a weir 12 extending transversely over its bottom. A stream 13 of liquid flows over said weir.

The sampling device 10 comprises a cup 14 together with means for dipping said cup into the stream of liquid and thereafter emptying said cup. These means include a pivoted and offset arm 15 actuated by a gear reduction motor 16 by means of a crank 17 and a driving link 18. The motor 16 is energized at predetermined intervals by means of a time controlled switch 16a. The cup 14 empties into an inclined gutter 19 that discharges into a storage container 20.

The bottom of the cup 14 is pierced by a port 21 adapted to seat the head 22 of a valve having a stem 23. The latter is slidably guided within the cup 14 by lugs 24. A valve spring 25 confined between the upper lug 24 and an annular flange 26 on the stem 23 urges the valve into the port 21.

As shown in Figures 1 and 2, the valve head 22 carries a downwardly projecting member 27 adapted to impinge, when the cup 14 is dipped into the stream 13, against a plate 28 supported from the bottom of the sewer 11. The plate 28 is disposed at such a level that the impingement of the member 27 thereagainst opens the port 21 when the bottom of the cup 14 is level with the crest of the weir 12.

The cup 14 is adjustably affixed to the pivoted arm 15 by means of a bolt 29 penetrating one of a number of longitudinally aligned holes 30 in a handle 31 of the cup 14. The effective length of the driving link 18 may be adjusted by means of a turnbuckle 32.

The driving link 18 is operatively connected to the arm 15 and the crank 17 by the pivot pins 33.

The arm 15 is bent at a right angle both horizontally and vertically and has one end pivotally fixed as indicated by the reference numeral 34.

The gear reduction motor 16 and the gutter 19 are supported in suitable positions by supporting members indicated, respectively, by the reference numerals 35 and 36.

The hereinabove described sampling device operates as follows:

The gear reduction motor 16 operates the crank 17, driving link 18, and arm 15 to dip the cup 14 into the stream 13 at equal predetermined intervals of time and after each dipping to lift the cup to an elevated horizontal position indicated in Figure 1 by dotted lines. When the cup is in this elevated position the sample collected in the cup flows therefrom along the inclined gutter 19 into the container 20.

As the sample cup approaches the position indicated in Figure 1 by full lines, the projection 27 strikes the plate 28, causing the valve 22 to be opened against the resistance of the spring 25. The various parts of the sampling device are so arranged and adjusted that when the valve is open, the top of the valve port 21 is level with the crest of the weir 12. As the cup 14 starts to return to its elevated position, the spring 25 causes the head 22 to close the valve port 21, thereby holding in the cup the sample which has entered into the cup during the interval in which the port 21 was open.

When the cup is in sampling position in the stream of liquid, a portion of the liquid in the sewer enters the cup so that the cup is filled to a level above the top of the valve indicated in Figure 1. This level $h$ is equal to the head of liquid above the crest of the weir 12.

In a liquid flowing in an open sewer or channel having a suitable weir, the rate of flow at a given instant can be calculated from or expressed in terms of the head $h$ of liquid above the crest of the weir. The calculation or form of expression varies according to the viscosity of the liquid as well as the dimensions and shapes of the sewer and weir.

The sample cup 14 is so designed that for any given depth $h$ of liquid therein, the volume contained in the cup is proportional to the quantity of liquid flowing in a definite time at the same head $h$ over the crest of the weir. The volumes of the individual samples taken will thus be proportional to the rate of flow in the sewer prevailing at the instants of sampling. Each sample is representative of the composition of the streaming liquid at the time of sampling.

Obviously, the accuracy with which the total sample measures the total flow and represents the average composition will depend on the interval between successive samples, shorter intervals resulting in greater accuracy. For paper mill use in the measurement of white water effluent, an interval of three minutes has been found satisfactory, yielding samples of normal size and not requiring a sampling cup of too small dimensions. A convenient design for the sample cup is one such that the volume contained in the cup at a given depth $h$ is one cubic inch for each one hundred gallons per minute flow at the same head $h$.

The cup may, of course, be designed to meet the requirements of any particular sampling problem, the interval between samples being adjustable by regulating the time controlled switch on the motor that actuates the cup arm, or by other conventional means.

In the case of a sampling device designed as indicated hereinabove, the total volume of sample taken over a comparatively long sampling period, when multiplied by the interval between samples (expressed in minutes) gives a volume figure which is equal to the total flow during the sampling period expressed in hundreds of gallons. This figure divided by the number of minutes in the sampling period and multiplied by one hundred is equal to the average flow in gallons per minute.

The total sample collected is representative of the average composition of the streaming liquid during the period of sampling, for each individual sample is representative of composition of the streaming liquid at the time of sampling, the volume of each individual sample at the same time being proportional to the rate of flow at the time of sampling.

Any other suitable dipping and sample uniting means than those disclosed hereinabove may be used, for instance, a rack and pinion arrangement. This invention is further not confined to the particular type of valve disclosed, other equivalent valve types being operative. The valve stem and guides can be placed outside the cup. As to valve opening and closing means, the projecting member 27 may be affixed to the plate 28 instead of to the valve 22. The member 27 may also be made long enough to strike either the bottom of the sewer or the valve, the plate 28 then being eliminated.

It is an essential part of this invention to design the valved sampling cup so that on being dipped into a stream of liquid flowing in an open channel, said cup will retain a sample having a volume proportional to the rate of flow at the time of sampling. For this purpose the cup may be given a number of shapes and volumes. For instance, if the head of liquid in the stream always reaches a level substantially above the bottom of said open channel or above the crest of any weir in said channel, or if it is desired to sample said liquid only when the head of liquid reaches said level substantially above the bottom of said crest, the sampling cup may be designed with that portion thereof below said level on dipping shallower but proportionally wider, the volume of the cup below said level being equal to the volume below said level of another cup designed to have its bottom level with the bottom of the channel or with the crest of a weir.

If a weir is not provided in the sewer, the bottom of the sewer may be depressed slightly at the point of sampling, so that the sampling cup can descend to a depth where the bottom of the cup is level with the bottom of the sewer.

It will be understood, therefore, that various details of construction and operation may be varied through a wide range without departing from the principles of this invention and it is, therefore, not the purpose to limit the patent granted hereon otherwise than necessitated by the scope of the appended claims.

I claim as my invention:

1. A device adapted for sampling a stream of liquid flowing in an open channel, said device comprising a cup whose liquid content at any liquid level therein is proportional to the rate of flow of said liquid at a head of liquid in said channel equal to said level, means for at equal intervals of time dipping said cup into said stream to a depth where admittance of said liquid into said cup would result in a meniscus in said cup spaced from the bottom of said cup by a distance equal to the head of liquid prevailing at the time of dipping, means for admitting said liquid into said cup when the latter reaches said depth, means identical with said dipping means for withdrawing said cup together with liquid admitted thereinto, means for retaining liquid admitted to said cup as the cup is withdrawn, and means for uniting successive portions of liquid thus withdrawn.

2. A device adapted for sampling a stream of liquid flowing over a weir in an open channel comprising a cup whose liquid content at any liquid level therein is proportional to the rate of flow of said liquid at a head over the crest of said weir equal to said level, reciprocally acting means for at equal intervals of time dipping said cup into said stream to a depth where the bottom of said cup is level with the crest of said weir, means for admitting said liquid into said cup when the latter reaches said depth, means identical with said dipping means for withdrawing said cup together with the liquid thus admitted thereinto, means for retaining liquid admitted to said cup as said cup is withdrawn, and means for uniting successive portions of liquid thus withdrawn.

3. A device adapted for sampling a stream of liquid flowing in an open channel, said device comprising a cup whose liquid content at any liquid level therein is proportional to the rate of flow of said liquid at a head of liquid in said channel equal to said level, means for at equal intervals of time dipping said cup into said stream to a depth where admittance of said liquid into said cup would result in a meniscus in said cup spaced from the bottom thereof by a distance equal to the head of liquid prevailing at the moment of dipping, a valve in the bottom of said cup, means for opening said valve when said cup reaches said depth, and for closing said valve when said cup is above said depth, means identical with said dipping means for withdrawing and for emptying said cup after said dipping, and means for uniting samples withdrawn at successive dippings.

4. A device adapted for sampling a stream of liquid flowing over a weir in an open channel, said device comprising a cup whose liquid content at any liquid level therein is proportional to the rate of flow of said liquid at a head of liquid over the crest of said weir equal to said level, means for at equal intervals dipping said cup into said stream to a depth where the bottom of said cup is level with the crest of said weir, said dipping means also functioning to empty said cup after each dipping, a valve in the bottom of said cup, resilient means for holding said valve closed, means for opening said valve against the resistance of said resilient valve closing means when the bottom of said cup reaches said depth, and a container adapted to receive the samples emptied from said cup.

5. A device adapted for sampling a stream of liquid flowing over a weir in an open channel, said device comprising a cup whose liquid content at any liquid level therein is proportional to the rate of flow of said liquid at a head of liquid over the crest of said weir equal to said level, a normally closed valve in the bottom of said cup, means for at equal intervals dipping said cup into said stream and thereafter tilting the same so as to discharge its contents comprising a motor, a pivoted offset bent arm whose free end is connected to said cup, a crank operatively connected to said motor and a driving link pivotally connected to said arm and to said crank, said dipping means being so adjusted that said cup is on dipping positioned with its bottom level with the top of said weir, means for opening said valve when said cup is thus positioned, and a container adapted to receive the samples discharged from said cup.

6. A device adapted for sampling a stream of liquid flowing over a weir in an open channel, said device comprising a cup whose liquid content at any liquid level therein is proportional to the rate of flow of said liquid at a head of liquid over the crest of said weir equal to said level, means for at equal intervals dipping said cup into said stream to a depth where the bottom of said cup is level with the crest of said weir, said dipping means also serving to empty said cup after each dipping, a valve in the bottom of said cup comprising a head, a downwardly projecting member on said head, a stem, and a spring normally holding said valve closed, said sampling device further comprising a member so supported in said channel that when said cup reaches said depth, the impingement of said downwardly projecting member against said supported member opens said valve against the resistance of said spring, and said sampling device additionally comprising a container adapted to receive the samples emptied from said cup.

RICHARD C. CRAIN.